July 16, 1968     D. E. BEACH     3,392,644

FLASH DEVICE

Filed July 12, 1965

DAVID E. BEACH
INVENTOR.

BY *R. Frank Smith*

*Ronald S. Kareken*

ATTORNEYS

United States Patent Office 3,392,644
Patented July 16, 1968

3,392,644
FLASH DEVICE
David E. Beach, Rochester, N.Y., assignor to Eastman Kodak Company, Rochester, N.Y., a corporation of New Jersey
Filed July 12, 1965, Ser. No. 471,009
5 Claims. (Cl. 95—11)

ABSTRACT OF THE DISCLOSURE

A camera flashholder adapted to receive a multilamp photoflash package in a rotatable socket. The package is automatically indexed through predetermined flash positions after each flash operation by an electromagnetic latch riding in the cam slot of a cam which rotates with the spring driven socket. The package is stopped at an in-between angle when all of the lamps have been fired to provide visible indication of this fact. The socket can move through more than one flash position during a single exposure to provide additional illumination if desired.

---

This invention relates to flash photography, and more particularly, to a flash device for automatically indexing a multi-lamp photoflash package.

There has recently been developed a multilamp photoflash package which comprises a plurality of photoflash lamps and individual reflectors mounted on a connecting base and disclosed, for example, in U.S. applications Ser. No. 417,913, now U.S. Patent No. 3,353,465, and 417,914, now U.S. Patent No. 3,327,105, filed Dec. 14, 1964. The present invention comprises a flash device suitable for receiving such packages and for automatically indexing a received package to sequentially place the flash lamps of the package in a photoflash circuit for firing in timed relation with camera operation.

In a preferred embodiment of the invention, the flash device includes a socket portion to receive a multilamp package, drive means energized by manual rotation of the socket and inserted package in one direction, and electrical means operable in response to each flash exposure for releasing of the drive means to index the package and place the subsequent flash lamp in the circuit. Further, the drive means includes stop means which provides a visual indication when all of the lamps of the photoflash package have been used.

A primary object of the invention resides, therefore, in the provision of a flash device to receive and automatically index a multilamp flash package through predetermined flash positions by electrical control means after each flash operation.

Another object of the invention resides in the provision of drive means which provides a visual indication when all of the lamps of the package have been used, by terminating movement of the package between two flash positions.

These and other objects and advantages will become more apparent during the course of the following description, the accompanying drawing forming a part thereof, and wherein.

Figure 1:
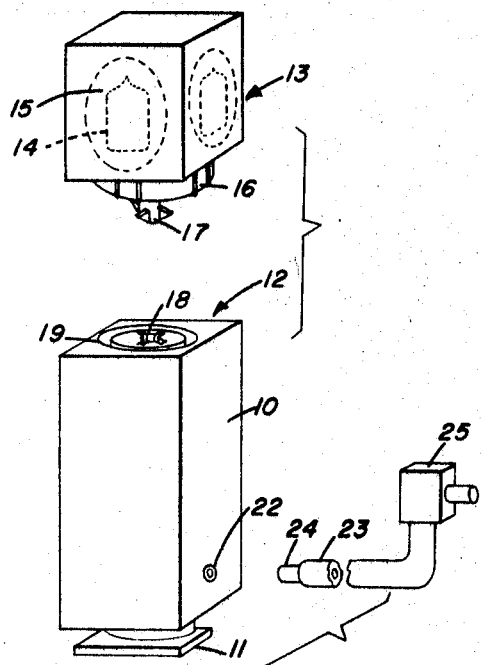
FIG. 1 is a perspective view of a preferred embodiment according to my invention, together with a disposable multilamp photoflash package suitable for use therewith.

Referring to FIG. 1, a flash device according to my invention suitably comprises a body portion 10, an attaching portion 11, and a socket portion 12 to receive a multi-lamp package. The body portion 10 contains the operating mechanism and electrical control means according to my invention. The attaching portion 11 may, as shown, suitably comprise an attaching foot for use with accessory shoes of photographic cameras, although any known arrangement for attaching the flash device to a camera may be used.

The socket portion 12 is configured to receive a disposable multilamp photoflash package 13 and to automatically index the package after each operation in timed relation with camera exposure. While the package 13 is more fully described in the above identified patent applications, it is shown here to comprise a plurality (4) of flash lamps 14 of known manufacture and individual dish-shaped reflectors 15 mounted on an attaching base within a light transmitting protective cover. The attaching base includes a central connecting post 17 and an annular depending contact ring 16 about which are wrapped the pairs of lead-in wires of the photoflash lamps.

Figure 2:
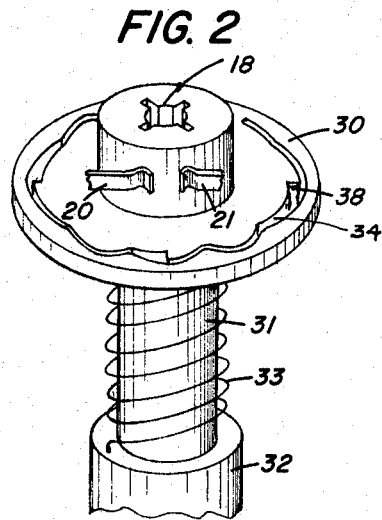
FIG. 2 is a partial perspective view of the drive mechanism.

The socket portion 12, as shown, includes a rotatable receiving socket 18 defining a central access opening to receive the package connecting post 17 and an annular recess 19 to receive the contact ring 16 of the flash package 13. Referring also to FIG. 2, a pair of fixed electrically conductive terminals 20, 21 from the flash circuit are positioned in the annular recess 19 to physically engage the pair of lead-in wires of a photoflash lamp 14 facing in the direction of desired light emission. The package 13 is attached in a fixed position relative to socket 18 for rotation therewith, and a means within the socket 18 for detachably retaining the package 13 in a fixed position relative to the socket portion is disclosed in my co-pending application Ser. No. 458,016, now U.S. Patent No. 3,353,468, filed May 24, 1965.

In the embodiment shown, the attaching foot 11 may suitably include electric conductor means for engagement with an accessory shoe having cooperating electric contacts. However, there is also included a cable socket 22 for insertion of a plug 24 to connect an electrical cable 23 to, for example, a continental connector on a photographic camera by plug 25.

As shown in FIG. 2, a drive mechanism according to my invention suitably includes a drive control cam disk 30 which is fixed to the socket 18 for rotation therewith. The disk 30 and socket 18 are supported by a shaft 31 which is mounted for rotation within a bearing support 32. To produce the rotation, I provide a helical drive spring 33 having its lower end fixed to the bearing support 32 and the upper end fixed to the lower surface of the control cam disk 30. The cam disk 30 defines a cam slot 34 to control the rotation produced by spring 33. The drive spring 33 is energized by insertion of a package 13 into the socket 18 in a fixed position relative to the socket, and manually rotating the package (together with the socket 18 and disc 30) in a counterclockwise direction (looking down) to the position shown in FIG. 2. The drive spring 33 then tends to rotate the socket 18 and inserted package 13 in the clockwise direction to place the lamps 14 in the photoflash circuit by successive engagement of the lead-in wires of each successive lamp 14 with the fixed terminals 20, 21.

Figure 3:
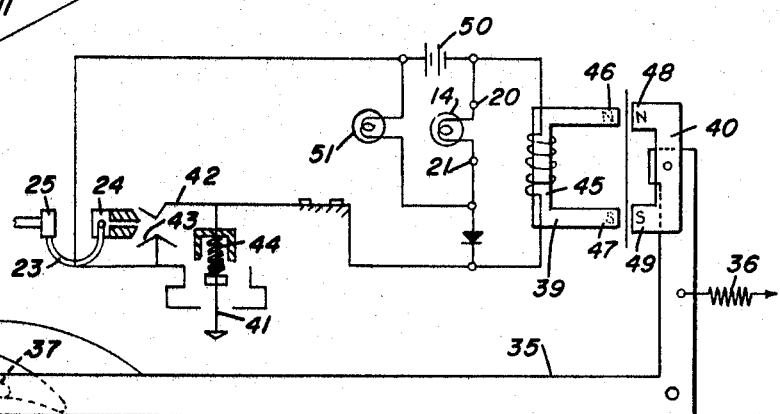
FIG. 3 is a schematic view showing operation of the electrical control means.
Figure 3:
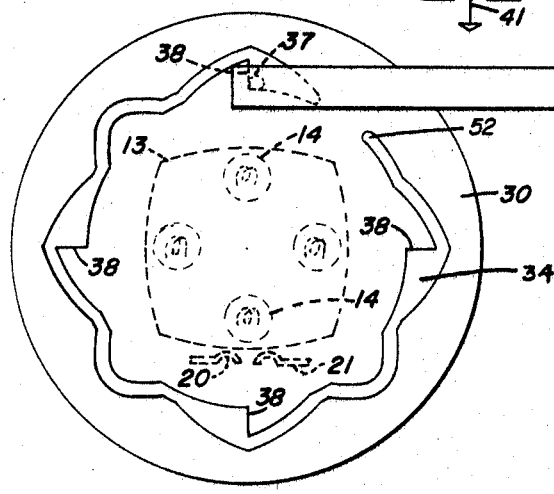

In order to control rotation in relation to camera operation, there is provided a pivoted metering lever or arm 35 having mounted at one end a pin 37 cooperating with and moving within the cam slot 34. Metering lever 35 is biased, as shown in FIG. 3, in the clockwise direction about its pivot by a tension spring 36.

The cam slot 34 defines a plurality (4) of control shoulders 38 engaged by the pin 37 to prevent socket rotation at each successive lamp position. To permit indexing of the package after each camera operation, the spring 36 urges the lever 35 clockwise to move pin 37 from engagement with a shoulder 38 into the continuous portion of slot 34, thereby enabling the drive spring 33 to rotate the inserted package 13 and disc 30 clockwise until the pin again engages a subsequent shoulder 38.

Control of the metering lever 35 after each operation of the device is accomplished by an electrical circuit which also forms the photoflash synchronizing circuit to fire the lamp in the circuit in timed relation with camera operation. As shown, the electrical control includes an electromagnet 39 which selectively controls the position of a permanent magnet 40 fixed to the other end of the metering lever 35. In relation to the remainder of flash synchronizing circuit, the attaching foot 11 defines the electrical ground which is engaged to camera ground represented by the accessory shoe. A central contact 41 is engageable with a like contact in the accessory shoe to complete the circuit to a flash synchronizer switch forming a part of the photographic camera. The central contact 41 is fixed to a movable contact 42 which, with ground terminal 43, forms the socket 22 for using the cable connector 23. A spring 44 is provided to urge central contact 41 downwardly, while insertion of plug 24 retracts central contact 41 upwardly against the bias of spring 44 to prevent electrical contact through the attaching foot 11 whenever the cable connector 23 is used.

The flash lamp 14 engaged by the terminals 20, 21 is positioned in the flash circuit as shown, and connected electrically in parallel therewith is a coil 45 of the electromagnet 39. A source of electric potential 50, suitably batteries, is provided to fire the lamp 14 in timed relation with camera operation whenever the synchronizing switch of the camera is closed to complete the circuit.

The soft iron core of electromagnet 39 is provided with a pair of magnetic north and south engagement poles 46, 47 oriented with corresponding like poles 48, 49 of the permanent magnet 40. Whenever a good flash lamp 14 engages terminals 20, 21, a circuit continuity exists through the lamp, and most of the current passes through the lamp 14. In this manner, there is no current through coil 45 to energize electromagnet 39. Normally, the magnetic attractive force of permanent magnet 40 is stronger than spring 36, and metering lever 35 is thus urged to the position shown in FIG. 3, with magnet 40 adjacent the soft iron core of electromagnet 39. In this position, pin 37 is engaged by a shoulder 38. However, when the flash lamp 14 is fired, all of the circuit current then passes through the electromagnet coil 45 to create a magnetic force at poles 46, 47. Because the adjacent poles of the electromagnet 39 and permanent magnet 40 are like poles, the magnet 40 is repelled, and spring 36 urges pin 37 out of engagement with the engaged shoulder 38.

As an added feature I have also shown an indicator light 51 which is lit whenever there is circuit continuity by a good flash lamp 14 in the circuit.

As can thus be seen, the presence of an unfired lamp 14 in the circuit enables the magnet 40 to be attracted toward the core of electromagnet 39 against the bias of spring 36, thereby causing pin 37 to come into engagement with a shoulder stop 38 and prevent socket rotation. When the lamp 14 in the circuit is fired in timed relation with camera operation, magnet 40 is repelled and pin 37 moves from shoulder 38 into the main portion of cam slot 34 to permit drive spring 33 to rotate the socket 18 and inserted package 13. As the next subsequent shoulder 38 approaches pin 37, the next subsequent lamp 14 moves into the flash circuit by engagement of its lead-in wires with the terminals 20, 21. When this occurs and the synchronizing switch of the flash circuit is opened, the current through coil 45 is again zero, and magnet 40 is attracted toward the core 39 to enable pin 37 to engage the subsequent shoulder 38 and terminate rotation.

The coil 45 of the electromagnet 39 is preferably of a delay acting type, as for example by adding a shorted loop, so that the developed magnet field to actuate indexing is delayed say 10 to 15 milliseconds, or after peak light output from the fired lamp has occurred. Similarly, the characteristics of drive spring 33 and the shape of cam slot 34 determine the cycle time required for complete rotation to the next lamp position. It is possible, therefore, to provide a shutter synchronizing switch which is closed during the entire period in which the shutter is open and thereby provide light from more than one lamp 14 by setting the shutter at a speed slower than the predetermined cycle time. For example, the cycle time for socket rotation may be 35 milliseconds including delay time. Thus, the shutter synchronizing switch will still be closed whenever shutter speeds are $\frac{1}{30}$ second or slower, and the next subsequent lamp will also be fired during the same exposure, thereby providing additional light to augment scene light.

In order to visually indicate whenever the inserted flash package has been completely used, I have provided a terminal end 52 in the cam slot 34, which is located after the shoulder 38 corresponding to the last lamp position at about one-half the distance to the first shoulder 38.

As shown in FIG. 3, the cam disc 30 is in position for firing the first of the four lamps in the circuit, in which the first shoulder 38 is engaged by pin 37. Thus, when all four lamps have been fired, the pin 37 engages the terminal end 52, and the position of the socket 18 will visually show the package to be between two flash positions. This readily indicates complete use of the package within the socket, and the package 13 can then be removed by pulling the connecting post 17 of the package 13 out of the socket 18.

While this invention has been described with respect to a preferred embodiment, it is obvious that various changes or modifications can be resorted to without departing from the spirit of my invention or the scope of the subjoined claims. In particular, it is possible that my invention may be included within the body of a photographic camera to provide a built-in flash system. In this case, the number of lamps fired for each exposure may be controlled by providing a selector which will vary the switch closing time as desired.

I claim:

1. A flash device comprising socket means to receive a package containing a plurality of photoflash lamps, means to move the socket and the package through a plurality of predetermined flash positions with a flash lamp of the received package in a photoflash circuit in each of the predetermined positions, control means to permit movement after each lamp firing, the control means comprising a cam disk movable with the socket and defining a cam slot having means stopping movement at each predetermined position, the cam slot having a terminal end to terminate movement of the socket and package to a position between two predetermined positions after the lamp in the last predetermined position has been fired.

2. A flash device comprising socket means to receive and to detachably hold a package containing a plurality of photoflash lamps, means to rotate the socket and package through a plurality of predetermined flash positions with a flash lamp of the received package in a photoflash circuit in each of the predetermined positions, stop means for preventing said socket means from being rotatable through a full 360 degrees, control means to permit rotation after each lamp firing, and means, including said stop means to terminate rotation of the socket and package between two of said predetermined rotational positions after all of the lamps of the package have been fired, said socket means for detachably holding said package continuing to hold the package in the in-between position for providing visible indication that all of said lamps have been fired.

3. A flash mechanism comprising:
   rotatable socket means to receive a detachable multi-lamp package containing a plurality of photoflash lamps and individual reflectors, drive means urging the socket means toward rotation in a predetermined direction through predetermined flash positions to sequentially place the lamps of a received package in a photoflash circuit, means to hold the socket means in one of the predetermined positions, and electrically controlled means responsive to the firing of a lamp in the photoflash circuit to release the holding means and permit rotation of the socket means as long as the photoflash circuit is closed and to reapply the holding means when the photoflash circuit opens to stop rotation of the socket means, whereby the number of flash positions through which the socket means rotates and therefore the number of photoflash lamps which are fired during the time the photoflash circuit is closed depends upon the length of time the circuit is closed.

4. A flash mechanism comprising:

rotatable socket means to receive a detachable multi-lamp package containing a plurality of photoflash lamps and individual reflectors, the socket means comprising a rotatable socket receiver to detachably retain a package in fixed relation thereto, a cam disk rotatable with the socket receiver, the cam disk defining a cam slot having a plurality of flash position shoulders spaced along the slot, drive means urging the socket means toward rotation in a predetermined direction through predetermined flash positions to sequentially place the lamps of a received package in a photoflash circuit, means to hold the socket means in one of the predetermined positions, the holding means comprising a pin engageable with the shoulders to hold the socket means in the flash positions, and electrically controlled means responsive to the firing of a lamp in the photoflash circuit to release the holding means and permit rotation of the socket means to a subsequent position.

5. A flash mechanism comprising:

rotatable socket means to receive a detachable multi-lamp package containing a plurality of photoflash lamps and individual reflectors, the socket means comprising a rotatable socket receiver to detachably retain a package in fixed relation thereto, and a cam disk rotatable with the socket receiver, the cam disk defining a cam slot having a plurality of flash position shoulders spaced along the slot, drive means urging the socket means toward rotation in a predetermined direction through predetermined flash positions to sequentially place the lamps of a received package in a photoflash circuit, means to hold the socket means in one of the predetermined positions, the holding means comprising a pin engageable with the shoulders to hold the socket means in the flash positions, electrically controlled means responsive to the firing of a lamp in the photoflash circuit to release the holding means and permit rotation of the socket means to a subsequent position, the electrically controlled means comprising an arm moving the pin from an engaged shoulder of the cam disk until the pin engages a subsequent shoulder.

permanent magnet means fixed to the arm, an electromagnet in the photoflash circuit, and means responsive to the firing of the lamp in a circuit to energize the electromagnet to repel the permanent magnet and cause the arm to move the pin from the engaged shoulder.

References Cited

UNITED STATES PATENTS

| | | | |
|---|---|---|---|
| 2,427,969 | 9/1947 | Lester | 240—37 XR |
| 2,697,390 | 12/1954 | Kindelberger | 95—11 |
| 3,096,025 | 7/1963 | Prochnow | 240—1.3 |
| 3,134,547 | 5/1964 | Kapteyn et al. | 95—11.5 XR |
| 3,263,068 | 7/1966 | Jakob | 240—1.3 |
| 3,319,547 | 5/1967 | Parsons et al. | 240—1.3 XR |

FOREIGN PATENTS 848,012    9/1952    Germany.

NORTON ANSHER, *Primary Examiner.*

FRED L. BRAUN, *Assistant Examiner.*